United States Patent
Zhu et al.

(10) Patent No.: US 9,690,298 B2
(45) Date of Patent: Jun. 27, 2017

(54) BORDER-SIGNAL GENERATING AND WIRE WINDING DEVICE FOR BORDER RECOGNITION OF SELF-PROPELLED MOWER

(71) Applicant: EGENPOWER INC., Laguna Niguel, CA (US)

(72) Inventors: Fei-Yun Zhu, Shenzhen (CN); Yao-Hsi Chiu, Taichung (TW)

(73) Assignee: EGENPOWER INC., Laguna Niguel, CA (US)

( * ) Notice: Subject to any disclaimer, the term of this patent is extended or adjusted under 35 U.S.C. 154(b) by 0 days.

(21) Appl. No.: 14/712,379

(22) Filed: May 14, 2015

(65) Prior Publication Data

US 2016/0334803 A1    Nov. 17, 2016

(51) Int. Cl.
*A01D 34/00* (2006.01)
*A01D 43/00* (2006.01)
*G05D 1/02* (2006.01)
*A01D 101/00* (2006.01)

(52) U.S. Cl.
CPC ......... *G05D 1/0276* (2013.01); *A01D 34/008* (2013.01); *A01D 2101/00* (2013.01); *G05D 2201/0208* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,128,840 A | * | 4/1964 | Barrett, Jr. ........... | A01B 69/008 180/167 |
| 3,550,714 A | * | 12/1970 | Bellinger ............. | A01D 34/008 180/168 |
| 6,108,597 A | * | 8/2000 | Kirchner ................... | E03F 7/12 180/167 |
| 6,255,793 B1 | * | 7/2001 | Peless .................. | A01D 34/008 180/168 |
| 6,417,641 B2 | * | 7/2002 | Peless .................. | A01D 34/008 318/580 |
| 6,850,024 B2 | * | 2/2005 | Peless .................. | A01D 34/008 318/568.12 |
| 7,155,309 B2 | * | 12/2006 | Peless .................. | G05D 1/0219 318/250 |
| 8,275,506 B1 | * | 9/2012 | Bishel .................. | A01D 34/008 701/25 |

(Continued)

*Primary Examiner* — Yonel Beaulieu
(74) *Attorney, Agent, or Firm* — Muncy, Geissler, Olds & Lowe, P.C.

(57) ABSTRACT

A border-signal generating and wire winding device for border recognition of a self-propelled mower includes a seat; a reel rotatably installed on the seat; a lever provided at one end of the reel for a user to operate and rotate the reel; two power sockets provided on the seat or on the reel; an electric wire removably wound around the reel and having two plugs at two ends thereof for being detachably plugged into the two power sockets; and a signal-generating module provided on the seat or on the reel and electrically connected to the two power sockets. When the electric wire is connected to the two power sockets through the two plugs, the signal-generating module continuously generates a border signal that is continuously transmitted to the electric wire through the two power sockets.

9 Claims, 6 Drawing Sheets

(56) References Cited

U.S. PATENT DOCUMENTS

| | | | |
|---|---|---|---|
| 8,868,237 B2 * | 10/2014 | Sandin | G05D 1/028 |
| | | | 700/258 |
| 2003/0023356 A1 * | 1/2003 | Keable | G05D 1/0219 |
| | | | 701/23 |
| 2013/0046457 A1 * | 2/2013 | Pettersson | G01C 21/3469 |
| | | | 701/117 |
| 2013/0333342 A1 * | 12/2013 | Keski-Luopa | A01D 43/14 |
| | | | 56/10.2 A |

* cited by examiner

BORDER-SIGNAL GENERATING AND WIRE WINDING DEVICE FOR BORDER RECOGNITION OF SELF-PROPELLED MOWER

BACKGROUND OF THE INVENTION

1. Technical Field

The present invention relates to border-generating technology for self-propelled mowers, and more particularly to a border-signal generating and wire winding device for border recognition of a self-propelled mower.

2. Description of Related Art

For greening our living environment, parks and household gardens are usually planted with turf, and therefore mowing has become an important maintenance work for keeping grass at a proper height over time.

A conventional walk-behind mower mows while a user pushes it toward a certain direction. However, for mowing an entire lawn, the user has to push the mower and walk over every inch of the lawn, making mowing a quite effort-consuming work. As an effort-saving option, a powered ride-on mover mows while a user rides it throughout the area to be mowed. While this does help to save some effort, it still needs the user's full operation.

A self-propelled mower thus has been introduced as a further improvement for it requires no manual operation and moves and mows on its own according to a preset route logic. Although manpower is somehow saved, there is risk that the mower becomes aberrant, blocked, and overturned. It is a present lack that a way for a user to define a border for a moving area for a self-propelled mower as needed.

BRIEF SUMMARY OF THE INVENTION

In view of the lack to be filled, the primary objective of the present invention is to provide a border-signal generating and wire winding device for border recognition of self-propelled mower, which allows a user to define a border for a moving area for a self-propelled mower as needed, so that the self-propelled mower is programmed to move in the moving area defined by the border set by the user.

Another objective of the present invention is to provide a border-signal generating and wire winding device for border recognition of self-propelled mower, which helps to wind and collet an electric wire for generating the border signal.

For achieving the foregoing objectives, the disclosed border-signal generating and wire winding device comprises: a seat; a reel, being rotatably installed on the seat; a lever, being provided at one end of the reel to be operated to drive the reel; two power sockets, being provided on the seat or on the reel; an electric wire, being removably wound around the reel and having two ends thereof each provided with a plug to be detachably plugged into the two power sockets; and a signal-generating module, being provided on the seat or on the reel and electrically connected to the two power sockets, so that when the electric wire is connected to the two power sockets through the two plugs, the signal-generating module continuously generates a border signal that is continuously transmitted to the electric wire through the two power sockets.

With the disclosed device, a user can set a border according to which a border signal is generated for the self-propelled mower to recognize and to move within an area defined by the border, and can store the electric wire with enhanced convenience.

DETAILED DESCRIPTION OF THE INVENTION

Figure 1:
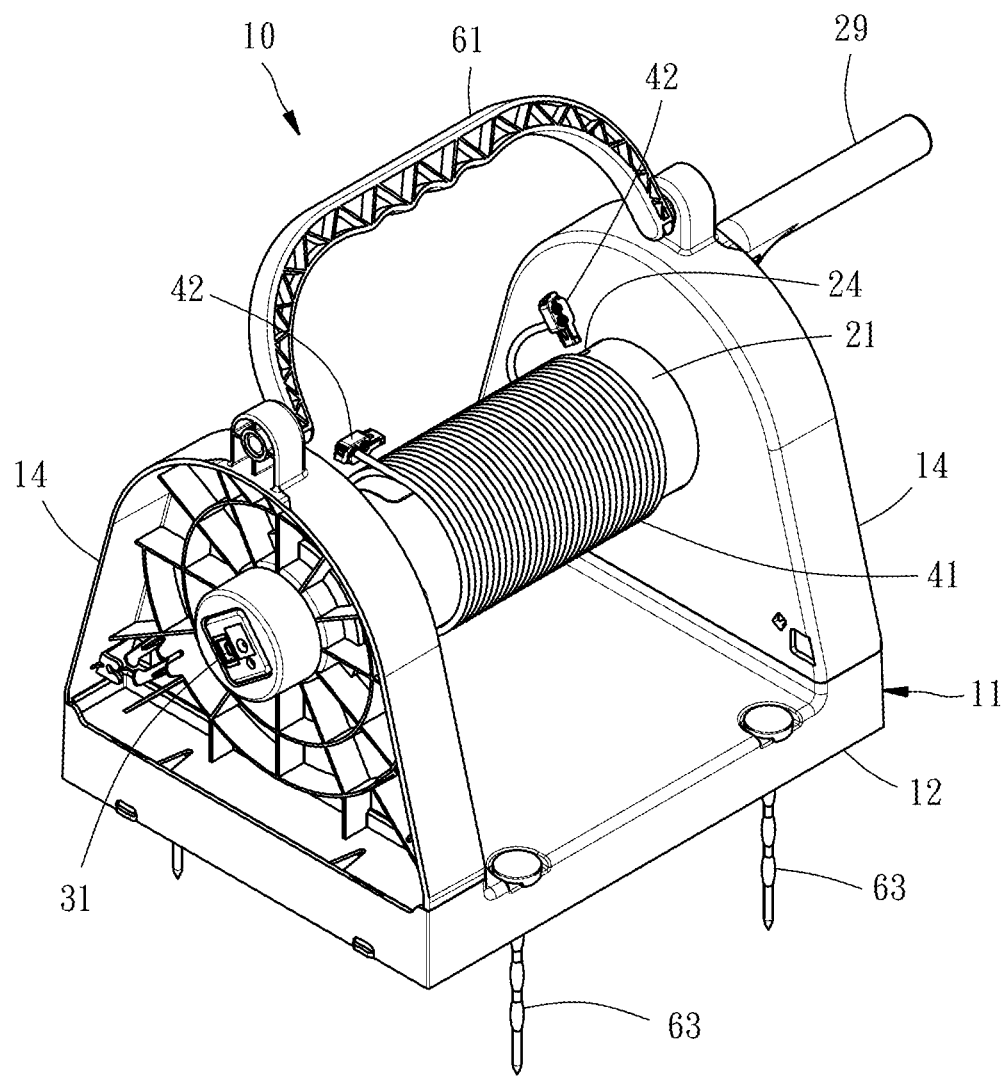
FIG. 1 is a perspective view of a preferred embodiment of the present invention.

For illustrating the technical features of the present invention in detail, the following description will be referred to some preferred embodiments in conjunction with accompanying drawings.

As shown in FIG. 1 through FIG. 7, in one preferred embodiment of the present invention, a border-signal generating and wire winding device for border recognition of self-propelled mower 10 primarily comprises a seat 11, a reel 21, a lever 29, two power sockets 31, an electric wire 41, and a signal-generating module 51.

The seat 11, in the present embodiment, has a bottom 12 and two vertical walls 14. The two vertical walls 14 stand at two sides of the bottom 12.

The reel 21 rotatably installed on the seat 11. In the present embodiment, the reel 21 is rotatably connected to the two vertical walls 14 and passing through the two vertical walls 14.

The lever 29 is provided at one end of the reel 21 to be operated by a user's hand to drive the reel 21. In the present embodiment, the lever 29 is fixed to one of exposed ends of the reel 21 exposed at the two vertical walls 14.

The two power sockets 31 are provided on the seat 11 or the reel 21. In the present embodiment, the two power sockets 31 are provided on the reel 21, each at one of two end surfaces of the reel 21. In other embodiments, the two power sockets 31 may alternatively be provided at the surface of the seat 11, instead of the end surfaces of the reel 21. In other words, while the power sockets 31 of the depicted embodiment are provided on the reel 21, this forms no limitation to the present invention.

Figure 4:
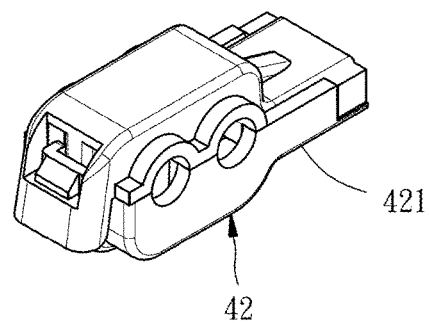
FIG. 4 is a partial perspective view of a preferred embodiment of the present invention, showing a plug.
Figure 5:
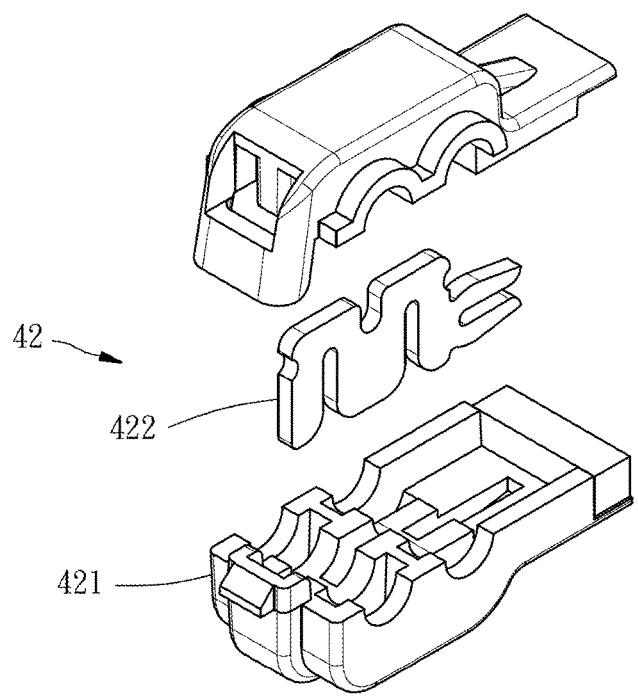
FIG. 5 is a partial exploded view of a preferred embodiment of the present invention, showing the plug.
Figure 6:
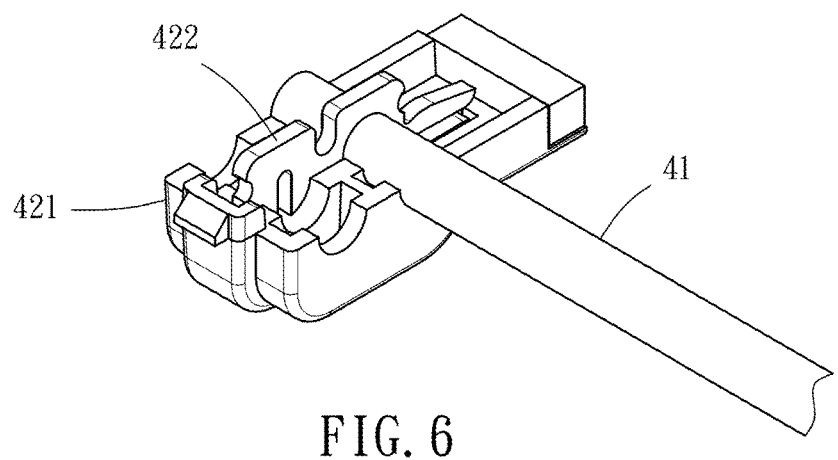
FIG. 6 is a partial assembly view of a preferred embodiment of the present invention, showing the plug combined with electric wires.

The electric wire 41 is removably wound around the reel 21. The electric wire 41 has two ends thereof each terminated with a plug 42, each of which is detachably plugged into the power socket 31 at one said end surface of the reel 21. As shown in FIG. 4 through FIG. 6, the plug 42 comprises an openable casing 421 and an electrically conductive fork 422 received in the casing 421. To assemble the plug 42 and the electric wire 41, the casing 421 is opened, and the electrically conductive fork 422 is such installed that it abuts against the electric wire 41, after which the casing is closed to force the electrically conductive fork 422 to cut into the surface of the electric wire 41, so as to come into electrical connection with the leading core (not shown) inside the electric wire 41.

Figure 3:
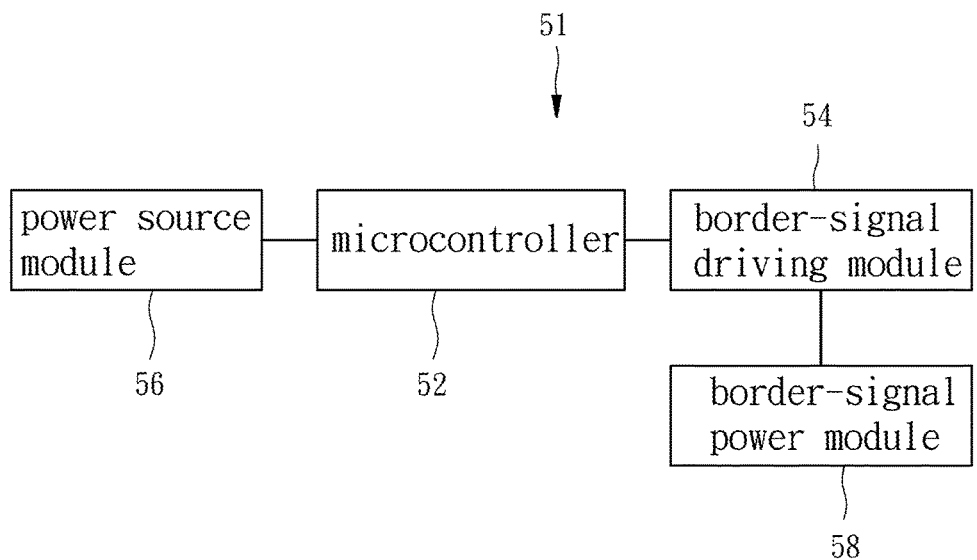
FIG. 3 is a circuit diagram of a preferred embodiment of the present invention.

The signal-generating module 51 is provided on the seat 11 or the reel 21, and is electrically connected to the two power sockets 31. When the electric wire 41 is connected to each of the power sockets 31 at the end surfaces of the reel 21 by means of the two plugs 42, the signal-generating module 51 continuously generates a border signal (not shown) that is continuously transmitted by the power sockets 31 to the electric wire 41 through the two plugs 42. In the present embodiment, as shown in FIG. 3, the signal-generating module 51 is composed of a microcontroller 52, a border-signal driving module 54, a power source module 56, and a border-signal power module 58. Thereby, the microcontroller 52 is powered by the power source module 56 and controls the border-signal driving module 54 to continuously generate the border signal. The border signal is amplified by the border-signal power module 58, and then transmitted to the electric wire 41 via the two power sockets 31 and the two plugs 42. In the present embodiment, the border signal is a pulse signal or a sine wave signal or a consistent DC voltage, and the continuous border signal maintains a magnetic field around the electric wire 41. Where the border signal is a pulse signal, the resultant magnetic field is of intermittence. Where the border signal is a sine wave signal, the resultant magnetic field is of a periodic changing magnitude. Where the border signal is a consistent DC voltage, the resultant magnetic field is of consistency. Additionally, in the present embodiment, the signal-generating module 51 is installed within the reel 21 for convenient electrical connection with the two power sockets 31. In other cases where the two power sockets 31 are provided on the seat 11, the signal-generating module 51 may also be located on the seat 11.

In the first embodiment, there are further a handle 61 and a plurality of nails 63. The handle 61 spans across the two vertical walls 14, for a user to grip and move the disclosed device. The nails 63 are fixed to the underside of the bottom 12 and extending downward to be inserted into the ground, thereby well positioning the disclosed device in use.

With the construction as disclosed above, the disclosed device is operated as follows.

Figure 7:
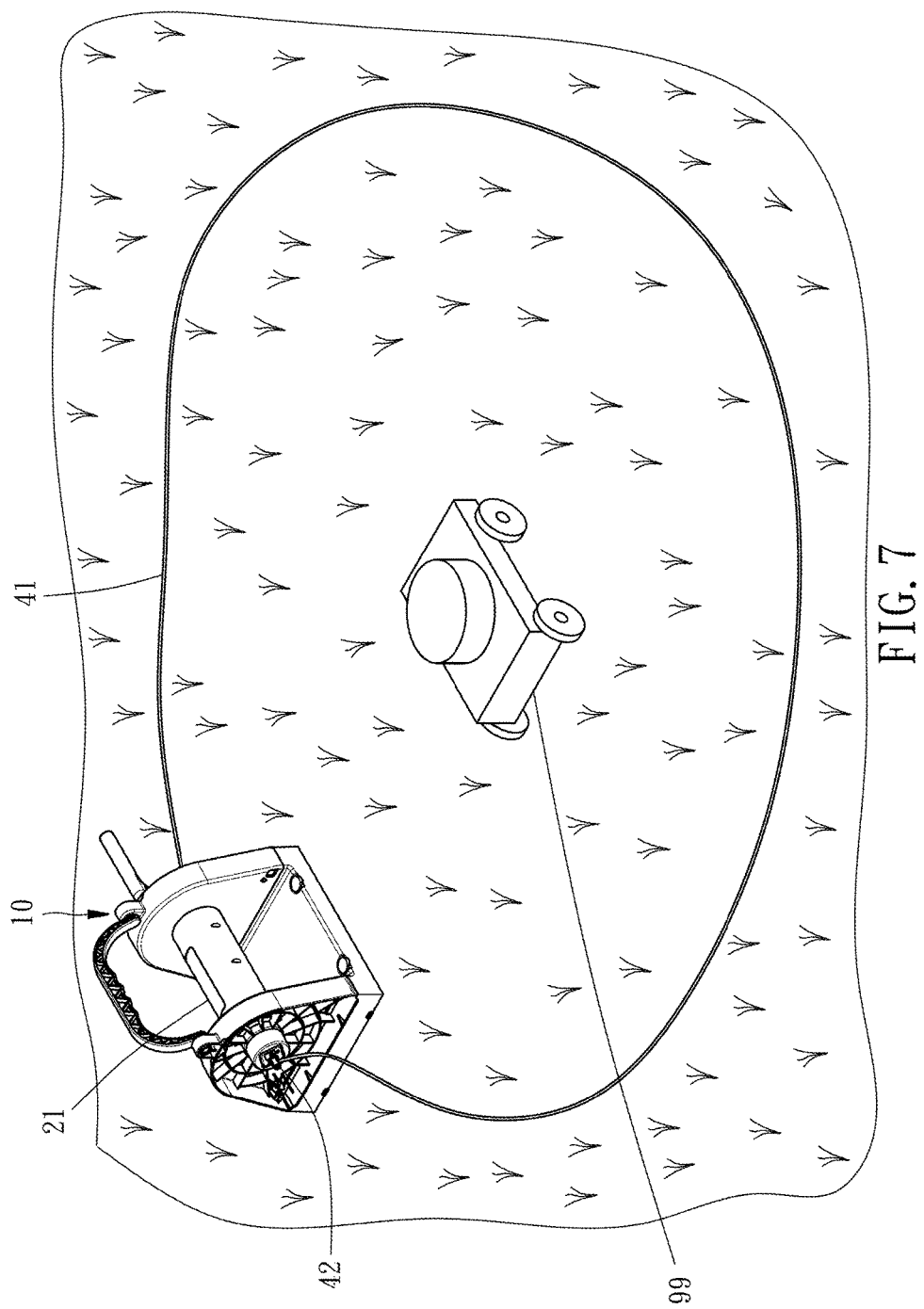
FIG. 7 is an applied view of the preferred embodiment of the present invention.

Referring to FIG. 7, before use, the electric wire 41 is wound around the reel 21.

As a preparation for use, the electric wire 41 is first unwound from the reel 21, and has the plugs 42 at its two ends plugged into the power sockets 31 at the end surfaces of the reels 21. Afterward, the electric wire 41 is arranged on the ground along a border of an area to be mowed. A user may first plug the plugs 42 to the power sockets 31 and then arrange the electric wire 41, or reverse the order at his/her convenience. Then, the signal-generating module 51 is activated (for example by operating a switch) to continuously generate a border signal that is transmitted to the electric wire 41. The definition of the border is thus completed. The user now can activate a self-propelled mower 99 within the bordered area for it to move over and mow the area. When the self-propelled mower 99 moves and approaches the electric wire 41 arranged on the ground, it determines whether the border is reached by sensing the magnetic field. If it is the case, the self-propelled mower 99 is steered by its own controller to turn around or change direction to avoid the border, thereby ensuring that the self-propelled mower 99 stays within the bordered area.

Figure 2:
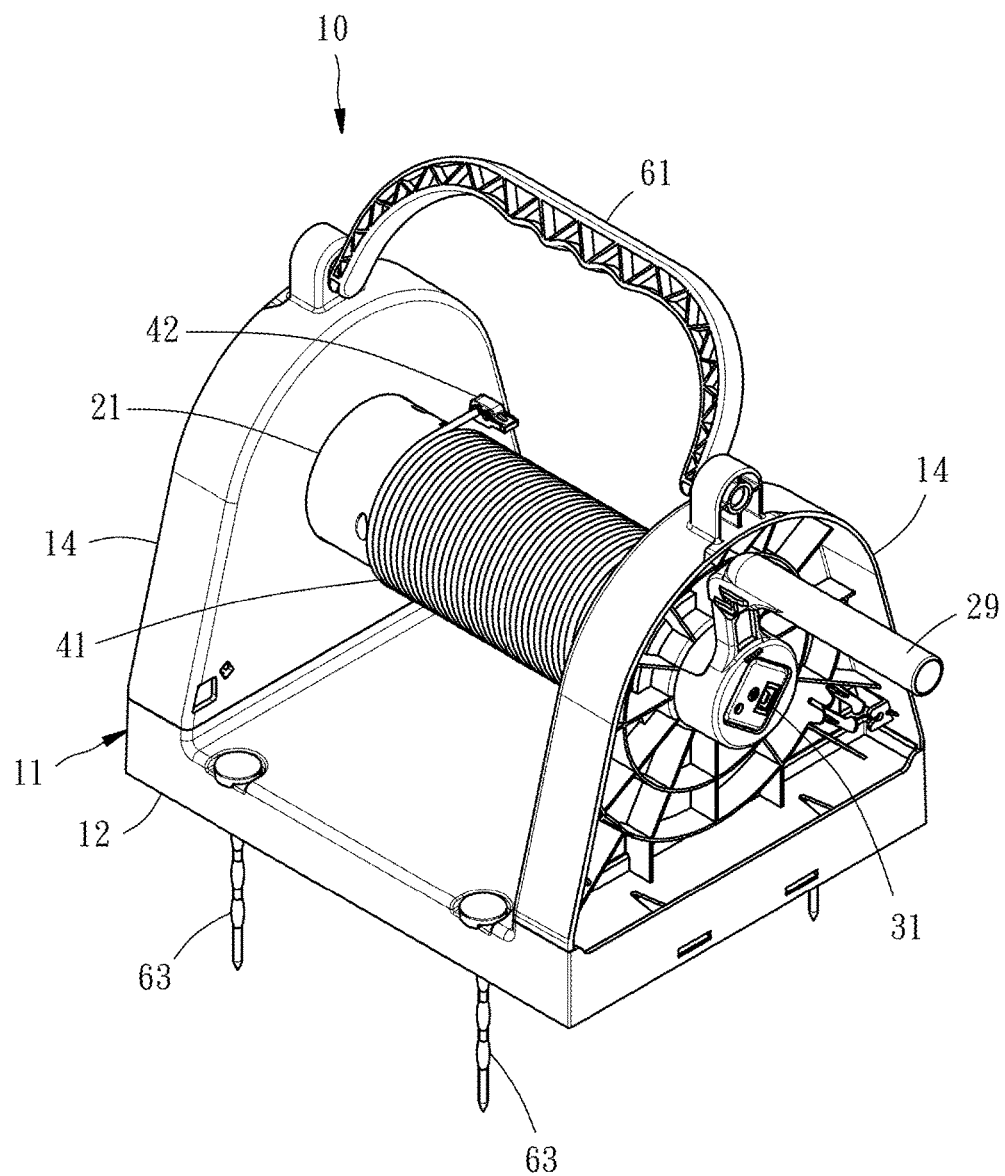
FIG. 2 is a perspective view of the preferred embodiment of the present invention taken from a different viewpoint.

For storage, as shown in FIG. 1 and FIG. 2, the plug 42 at one end of the electric wire 41 is plugged into a holder 24 formed on the periphery of the reel 21. The holder 24 is not electrically conductive and merely serves to hold the plug 42. Thereby, one end of the electric wire 41 is positioned with respective to the reel 21, and by rolling the lever 29, the electric wire 41 can be wound around the reel 21 easily. As another approach to winding the electric wire 41 around the reels 21, the two plugs 42 of the electric wire 41 are removed from the two power sockets 31, and the electric wire 41 is wound around the reel 21 after which the lever 29 is operated to wind the electric wire 41 around the reels 21.

With the disclosed device, a user can set a border according to which a border signal is generated for the self-propelled mower 99 to recognize and to move within an area defined by the border, and can store the electric wire 41 with enhanced convenience.

Figure 8:
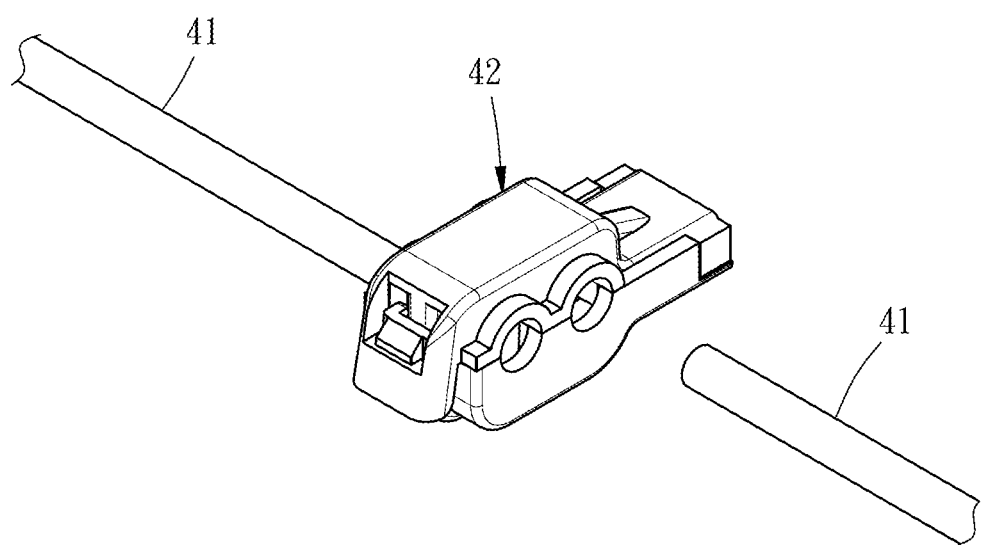
FIG. 8 is a schematic drawing according to a preferred embodiment of the present invention wherein electric wires are to be connected in series.

It is to be noted that, as shown in FIG. 8, where the electric wire 41 needs to be longer, an additional electric wire may be connected in series thereto by means of a plug 42 for meeting the need. To do this, the electrically conductive fork 422 is connected to the two electric wires 41 so as to electrically connect the two electric wires 41 in series. Where the two electric wire is considered longer than what is needed, it is possible to place the electrically conductive fork 422 in the plugs 42 at a desired length of the electric wire 41, and to plug the plug 42 into the power socket 31 on the reel 21 so as to get rid of the excessive length of the electric wire 41 without trimming it.

What is claimed is:

1. A border-signal generating and wire winding device for border recognition of a self-propelled mower, comprising:
    a seat;
    a reel, being rotatably installed on the seat;
    a lever, mounted at one end of the reel to be operated to drive the reel;
    two power sockets, mounted on the seat or on the reel;
    an electric wire, being removably wound around the reel and having two ends thereof each provided with a plug to be detachably plugged into the two power sockets; and
    a signal generator, mounted on the seat or on the reel and electrically connected to the two power sockets, so that when the electric wire is connected to the two power sockets through the two plugs, the signal generator continuously generates a border signal that is continuously transmitted to the electric wire through the two power sockets.

2. The border-signal generating and wire winding device of claim 1, wherein the signal generator comprises a microcontroller, a border-signal driving module, a power source module, and a border-signal power module.

3. The border-signal generating and wire winding device of claim 1, wherein the border signal is a pulse signal or a sine wave signal or a consistent DC voltage.

4. The border-signal generating and wire winding device of claim 1, wherein the seat has a bottom and two vertical walls standing at two sides of the bottom, and the reel is rotatably connected to the two vertical walls and passing through the two vertical walls.

5. The border-signal generating and wire winding device of claim 4, wherein the two power sockets are provided on the reel.

6. The border-signal generating and wire winding device of claim 4, wherein the lever is fixed to one of exposed ends of the reel exposed at the two vertical walls.

7. The border-signal generating and wire winding device of claim 4, further comprising a handle that spans across the two vertical walls.

8. The border-signal generating and wire winding device of claim 4, further comprising a plurality of nails provided at an underside of the bottom and extending downward to be inserted into a ground, thereby positioning the border-signal generating and wire winding device in use.

9. The border-signal generating and wire winding device of claim 1, wherein each said plug comprises an openable casing and an electrically conductive fork received in the casing, and is assembled with the electric wire, in which the electrically conductive fork abuts against the electric wire so as to cut into a surface of the electric wire and come into electrical connection with a leading core inside the electric wire, and the casing is closed to cover the electrically conductive fork and a part of the electric wire.

* * * * *